(12) United States Patent
Yokoyama et al.

(10) Patent No.: US 9,395,530 B2
(45) Date of Patent: Jul. 19, 2016

(54) MAGNIFIER FOR SEWING MACHINE

(71) Applicant: JANOME SEWING MACHINE Co., Ltd., Tokyo (JP)

(72) Inventors: Ushio Yokoyama, Tokyo (JP); Yosuke Iizuka, Tokyo (JP); Koji Maeda, Tokyo (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 0 days.

(21) Appl. No.: 14/460,246

(22) Filed: Aug. 14, 2014

(65) Prior Publication Data

US 2015/0055232 A1 Feb. 26, 2015

(30) Foreign Application Priority Data

Aug. 22, 2013 (JP) ................... 2013-171934

(51) Int. Cl.
*G02B 3/00* (2006.01)
*G02B 27/02* (2006.01)
(Continued)

(52) U.S. Cl.
CPC ........... *G02B 25/005* (2013.01); *D05B 3/02* (2013.01); *D05B 79/00* (2013.01); *G02B 25/002* (2013.01); *D05B 3/22* (2013.01); *D05B 3/24* (2013.01); *D05C 3/02* (2013.01); *G02B 7/02* (2013.01)

(58) Field of Classification Search
CPC ...... G02B 25/002; G02B 25/005; G02B 7/02; D05C 3/02; D05B 3/02; D05B 3/22; D05B 3/24; D05B 33/003; D05B 49/02; D05B 79/00; D05B 87/04
USPC ......... 359/809–811, 802, 804, 805, 818, 819, 359/815, 723; 112/78, 98, 113, 165, 246, 112/250, 448
See application file for complete search history.

(56) References Cited

U.S. PATENT DOCUMENTS 1,567,439 A * 12/1925 Heitzler ............... G02B 25/005
112/270
1,806,252 A * 5/1931 Hohein ................. D05B 87/04
359/818

(Continued)

FOREIGN PATENT DOCUMENTS

JP  7-9279 U   2/1995
JP  H10-258197 A  9/1998

(Continued)

OTHER PUBLICATIONS

Extended European Search Report dated Dec. 19, 2014.

*Primary Examiner* — Loha Ben
(74) *Attorney, Agent, or Firm* — McGinn IP Law Group PLLC

(57) ABSTRACT

The invention provides a magnifier for a sewing machine that is mounted on a sewing machine main body and magnifies a view of a front end of a needle which is mounted on a needle bar front end that moves vertically and a vicinity of a cloth presser.
The magnifier includes: a supporting arm part A, at one end of which a lens holding part 2 having a holding unit 4 that detachably holds a lens is provided, and at the other end of which a mounting part 3 for mounting the magnifier on the sewing machine main body is provided; and a lens main body B that is constituted by connected part 6 which is detachable to the lens holding part 2, and a lens part 5 which is formed continuously to the connected part 6. To the lens holding part 2 of the supporting arm part A as well as the lens main body B, a turning control unit 7 is provided which controls a turning angle of the lens main body B in a predetermined range, and the turning control unit 7 controls a turning angle of the lens main body B that is mounted on the lens holding part 2, in a predetermined range.

5 Claims, 9 Drawing Sheets

(51) Int. Cl.
*D05B 3/22* (2006.01)
*D05C 3/02* (2006.01)
*G02B 25/00* (2006.01)
*D05B 3/02* (2006.01)
*D05B 79/00* (2006.01)
*G02B 7/02* (2006.01)
*D05B 3/24* (2006.01)

(56) References Cited

U.S. PATENT DOCUMENTS 3,127,857 A * 4/1964 Medoff ............... D05B 33/003
112/113
3,162,154 A * 12/1964 Medoff ............... D05B 33/003
112/153
3,822,088 A 7/1974 Steiner
4,084,216 A 4/1978 Shonting
6,332,418 B2 * 12/2001 Hayashi .................. 112/260
8,292,446 B2 * 10/2012 Fujihara ............... D05B 79/00
362/249.01

FOREIGN PATENT DOCUMENTS

JP 11-267388 A 10/1999
JP 2002-018168 A 1/2002

* cited by examiner

ENLARGED PART(Q1)

ENLARGED VIEW ALONG ARROW LINE Y1-Y1

$\theta 1 = \theta 2$

ENLARGED CROSS SECTION OF PART (Q2)

ENLARGED CROSS SECTION OF SEPARATED PORTION (Q2)

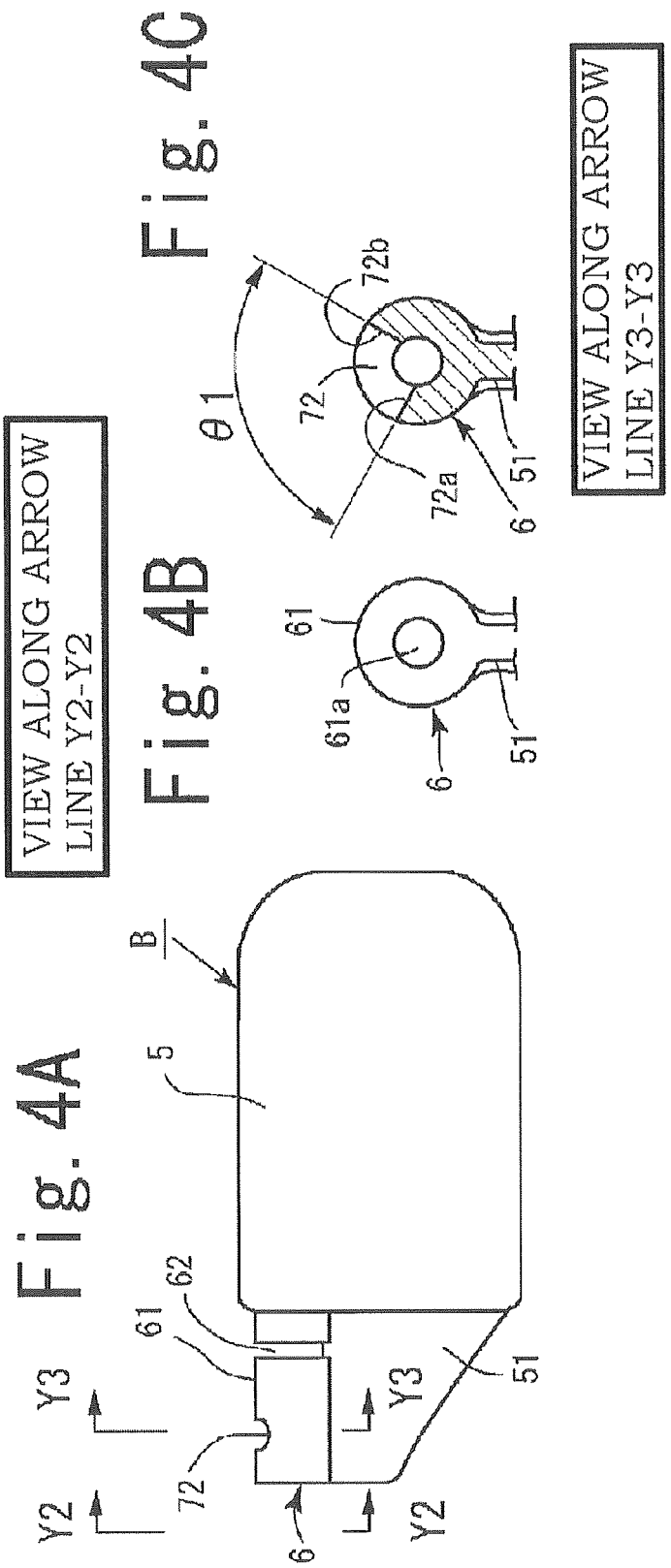

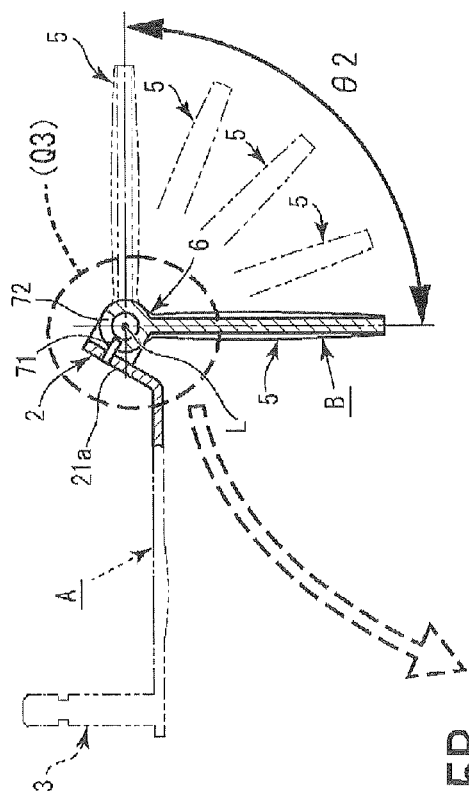
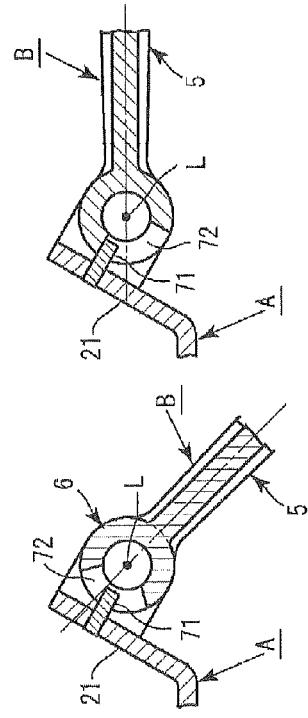
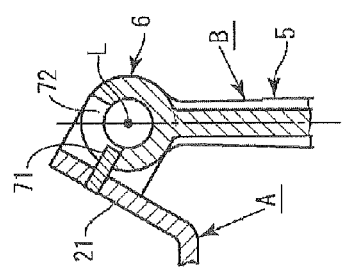

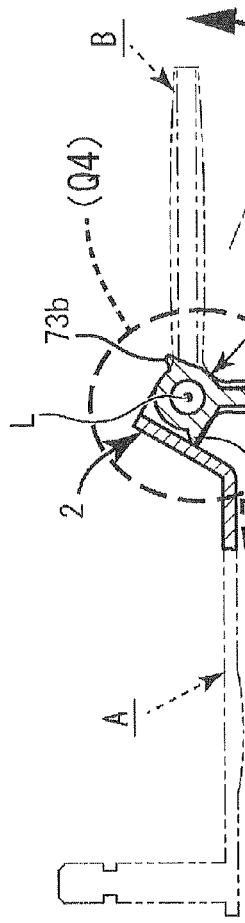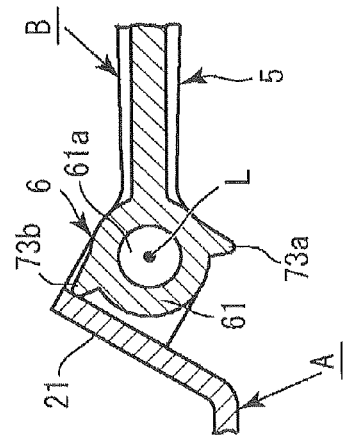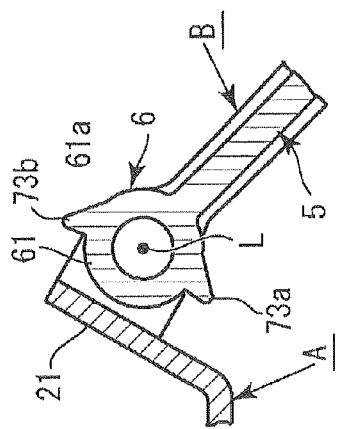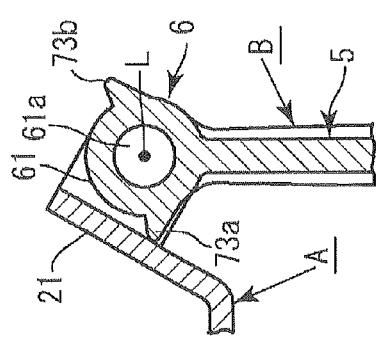

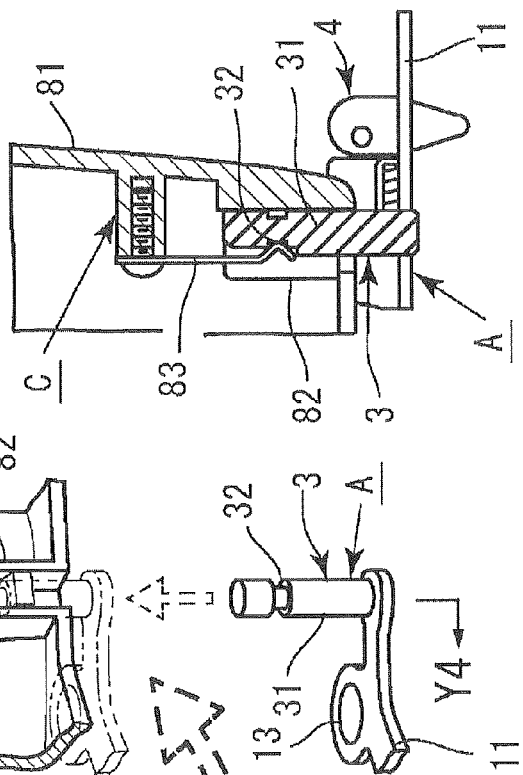
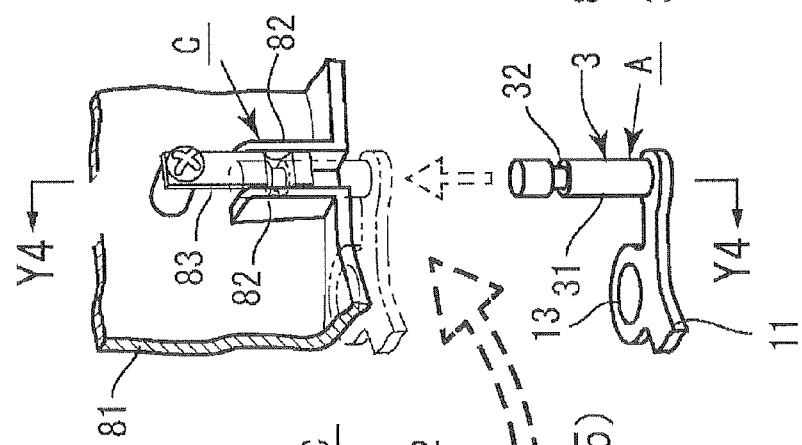
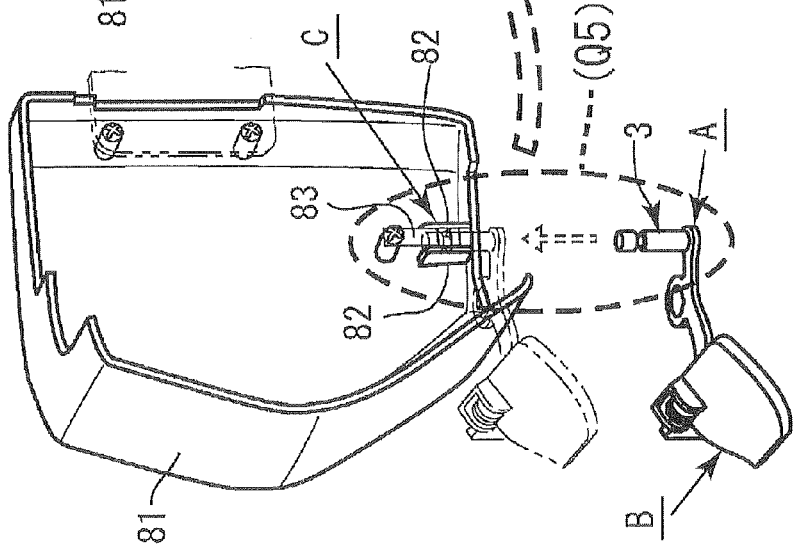

Fig. 8A
Fig. 8C
Fig. 8B
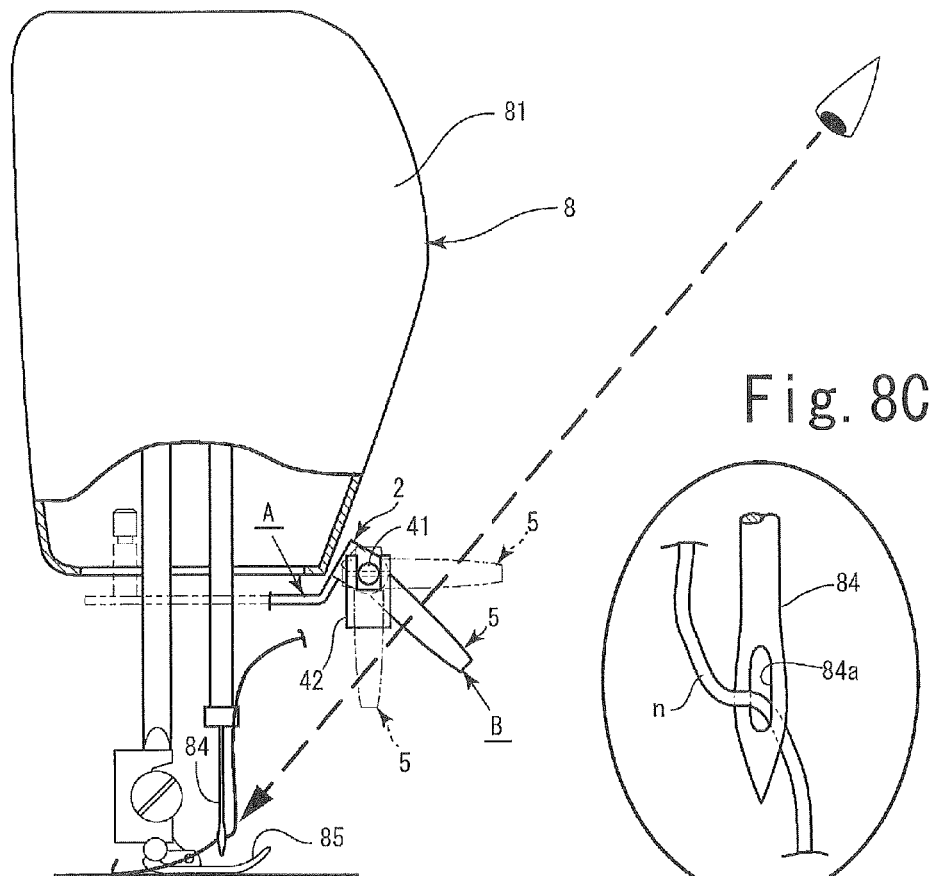
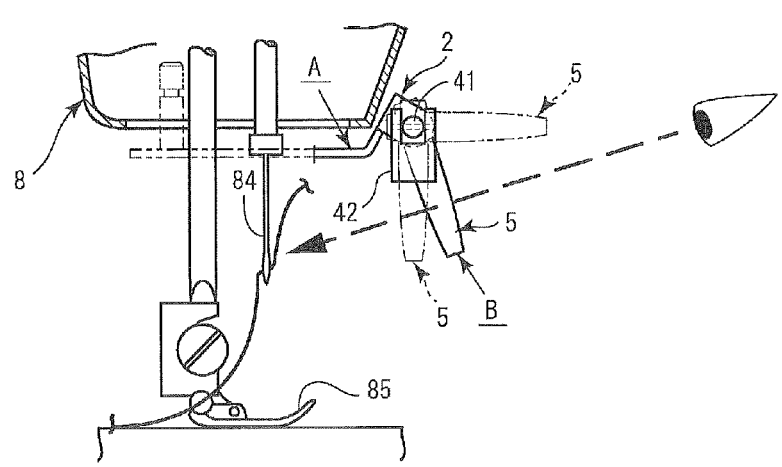

MAGNIFIER FOR SEWING MACHINE

BACKGROUND OF THE INVENTION

1. Field of the Invention

The present invention relates to a magnifier for a sewing machine which can be easily mounted on the sewing machine, for which lenses of various magnifications can be used, and in which angle adjustment in horizontal and vertical directions can be implemented at a higher level of flexibility along a line of sight of an operator.

2. Description of the Related Art

In general, in use of home-use sewing machines, at a preparatory stage of operation a thread is always passed through a needle hole of the machine. Most of the sewing machines currently in use are equipped with a needle threader device for the needle hole. However, sewing machines that are not equipped with such a needle threader device are available, for which a thread must be manually passed through the needle hole.

Therefore, in order to support a threading operation, a magnifier (a lens) that can be mounted on the sewing machine is useful. The magnifier is also useful to decide by visual observation whether the thread has been securely passed through the needle hole of the sewing machine needle.

Further, there is also a case where the magnifier is necessary when exchanging a sewing machine needle or a tool such as a cloth presser, and cleaning of waste thread and the like in the surrounding of a needle plate. Such magnifiers that can be mounted on the sewing machine have been disclosed in Japanese Patent Application Laid-open No. H11-267388, Japanese Patent Application Laid-open No. 2002-18168, Japanese Utility Model Application Laid-open No. H07-9279, and U.S. Pat. No. 3,822,088.

SUMMARY OF THE INVENTION

It is general that operators of sewing machines have different eyesight and fields of view. Therefore, the magnifiers disclosed in that can be mounted on the sewing machine have been disclosed in Japanese Patent Application Laid-open No. H11-267388, Japanese Patent Application Laid-open No. 2002-18168, Japanese Utility Model Application Laid-open No. H07-9279, and U.S. Pat. No. 3,822,088 are not satisfactory for the operators, although a position or an angle of the lens can be changed to some extent. According to the magnifier disclosed in U.S. Pat. No. 3,822,088, although a degree of freedom for adjustment of a position or an angle of the lens is high, a structure of the magnifier is complex, and the device is a relatively large type.

Particularly, in U.S. Pat. No. 3,822,088, because the device is a large type, there is a sufficient risk that the device becomes an interference with the intrinsic machine sewing operation. Therefore, an object (a technical problem to be solved) of the present invention is to provide a magnifier for a sewing machine in which adjustment of a horizontal position and a vertical position of the lens becomes easy in an extremely simple structure.

In order to solve the above problem, as a result of intensive studies carried out, the present inventor has provided a magnifier for a sewing machine as a first implementation mode of the present invention. The magnifier for a sewing machine is mounted on a sewing machine main body and magnifies a view of a front end of a needle which is mounted on a needle bar front end that moves vertically and a vicinity of a cloth presser. The magnifier includes: a supporting arm part, at one end of which a lens holding part having a holding unit that detachably holds a lens is provided, and at the other end of which a mounting part for mounting the magnifier on the sewing machine main body is provided; and a lens main body that is constituted by a connected part which is detachable to the lens holding part, and a lens part which is formed continuously to the connected part. To the lens holding part of the supporting arm part as well as the lens main body, a turning control unit is provided which controls a turning angle of the lens main body within a predetermined range. The turning control unit controls a turning angle of the lens main body that is mounted on the lens holding part, within a predetermined range.

A second implementation mode of the present invention provides the magnifier for a sewing machine according to the first implementation mode, in which the turning control unit has a control member formed on a side of the lens holding part, and the connected part of the lens main body has a control groove part in which the control member is loosely inserted. With this arrangement, the above problem is solved.

A third implementation mode of the present invention provides the magnifier for a sewing machine according to the first implementation mode, in which the turning control unit has a protrusion part which is formed on an outer peripheral part of the connected part of the lens main body, and which controls turning of the lens main body by contacting the lens holding part. With this arrangement, the above problem is solved. A fourth implementation mode of the present invention provides the magnifier for a sewing machine according to the first implementation mode, in which the range of turning the lens main body by the turning control unit is a range within which the state of the lens part transforms to a vertical state from a horizontal state. With this arrangement, the above problem is solved.

A fifth implementation mode of the present invention provides the magnifier for a sewing machine according to the first or second implementation mode, in which a fitted groove part which is formed on an outer peripheral surface of the mounting part and a fitting elastic plate piece which is provided on a face plate of the sewing machine main body are rotatably fitted and connected together, and the supporting arm part is turnable on a horizontal surface.

According to the present invention, in a lens holding part of a supporting arm part, a lens body having a detachable connected part that is turnable to a horizontal axis is mounted on a lens holding part. The lens holding part includes a holding unit that holds the lens main body. The supporting arm part and the lens main body are provided with a turning control unit that controls a turning angle of the lens main body in a predetermined range.

The control range of the turning control unit is set in advance so that a position of a sewing machine needle and a position of a needle bar on which the sewing machine needle is mounted do not interfere with each other. With this arrangement, it becomes possible to achieve the object of magnifying a view of a front end of the needle which is mounted on a front end of a downward-moving needle bar mounted on a sewing machine main body and magnifying the view of a vicinity of a cloth presser. Moreover, it becomes possible to prevent a beginner operator from an accident such as injury due to breaking of the needle during a sewing operation, and also it becomes possible to secure safety.

The lens main body is set turnable to the horizontal axis in the lens holding part of the supporting arm part. Therefore, the lens main body can be set to a predetermined angle to the horizontal axis. By setting an inclination angle which is optimum for the operator, a threading operation of the needle hole becomes easy.

Further, the supporting arm part and the lens main body are in a detachable structure. Therefore, in starting the sewing operation, an ordinary operation space of the sewing machine can be secured by detaching the lens main body from the supporting arm part. Because the holding unit can detachably mount the lens, a lens that includes a connected part which is adapted to the holding unit can be freely exchanged.

BRIEF DESCRIPTION OF THE DRAWINGS

FIG. 4A is a plan view of a lens main body, FIG. 4B is a sectional view taken along an arrow line Y2-Y2 in FIG. 4A, and FIG. 4C is a sectional view taken along an arrow line Y3-Y3 in FIG. 4A;

FIG. 5A is a main-part vertical sectional side view showing a state in which the lens main body which is mounted on the supporting arm turns, FIG. 5B is an enlarged view of a state in which the lens main body is vertical in the part (Q3) in FIG. 5A, FIG. 5C is an enlarged view of a state in which the lens main body is inclined in the part (Q3) in FIG. 5A, and FIG. 5D is an enlarged view of a state in which the lens main body is horizontal in the part (Q3) in FIG. 5A;

FIG. 6A is a main-part vertical sectional side view showing a state in which a lens main body, which is mounted on a supporting arm in another embodiment of a turning control unit turns, FIG. 6B is an enlarged view of a state in which the lens main body is vertical in the part (Q3) in FIG. 6A, FIG. 6C is an enlarged view of a state in which the lens main body is inclined in a part δ in FIG. 6A, and FIG. 6D is an enlarged view of a state in which the lens main body is horizontal in a part (Q4) in FIG. 6A;

FIG. 7A is a perspective view of a state in which a magnifier of the present invention is about to be mounted on a sewing machine face plate, FIG. 7B is an enlarged view of a part (Q5) in FIG. 7A, and FIG. 7C is a sectional view along an arrow line Y4-Y4 in FIG. 7B;

FIG. 8A is a partially cut side view of a state in which a sewing machine needle which is positioned near a needle plate is visually observed through the magnifier, FIG. 8B is a partially cut side view of a state in which the sewing machine needle which moved to a higher position is visually observed through the magnifier; and FIG. 8C is an enlarged view of a state in which a thread is passed through a needle hole of the sewing machine needle via the lens main body.

DESCRIPTION OF THE PREFERRED EMBODIMENTS

Figure 1A:
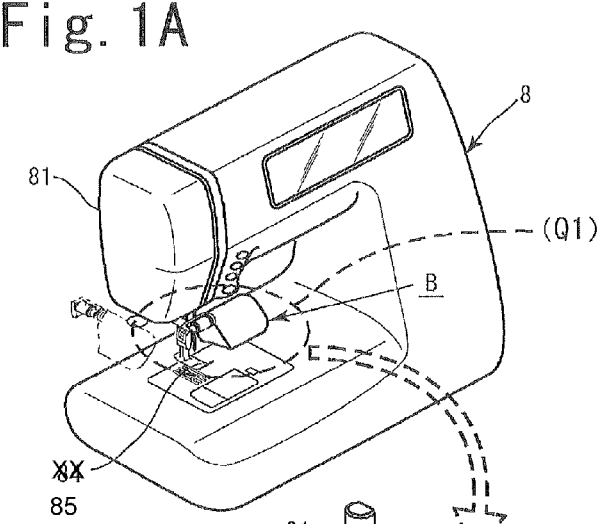
FIG. 1A is a perspective view of a state in which a magnifier of the present invention is mounted on a sewing machine main body.

Hereinafter, embodiments of the present invention will be described with reference to the drawings. As shown in FIGS. 1B, 2A, 2B, 3A, and 3B, the present invention is configured by a supporting arm part A, and a lens main body B. The supporting arm part A is configured by a lens holding part 2 and a mounting part 3 as shown in FIGS. 2A and 2B. The lens main body B is configured by a lens part 5, and a connected part 6 (see FIGS. 2B, 4A to 4C, etc.).

The supporting arm part A is formed by a thin plate metal material, and is configured planarly by a straight line arm piece 11 and an inclined arm piece 12. The inclined arm piece 12 is formed to have an appropriate inclination angle on a horizontal surface, to the straight line arm piece 11 (see FIGS. 1B, 2A, and 2B).

The lens holding part 2 is formed at one end side in a longitudinal direction of the inclined arm piece 12 of the supporting arm part A, and the mounting part 3 is formed at the other end side in the longitudinal direction of the inclined arm piece 12 (see FIGS. 2A and 2B). Specifically, the lens holding part 2 is provided in the inclined arm piece 12 of the supporting arm part A, and the mounting part 3 is provided in a vertical shape at an end part position of the straight line arm piece 11 (see FIGS. 1B, 2B, and 7A to 7C).

Figure 2A:
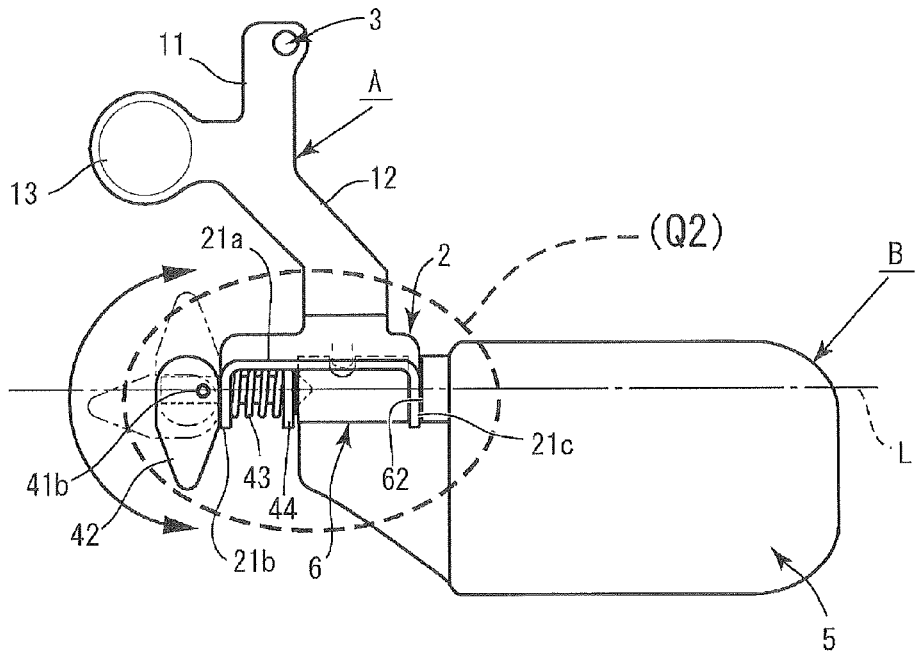
FIG. 2A is a plan view of the present invention.
Figure 2B:
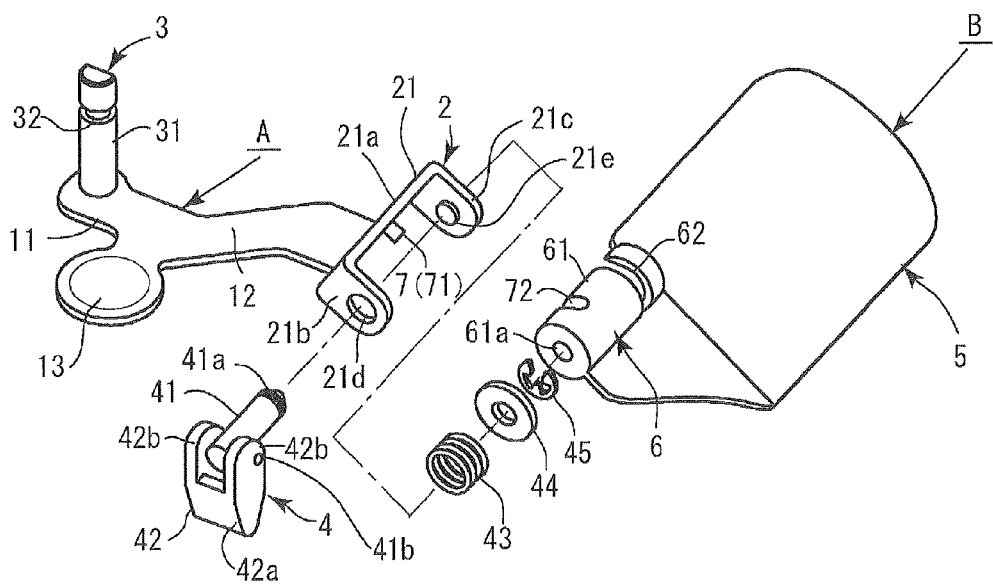
FIG. 2B is an exploded perspective view of the present invention.
Figure 3A:
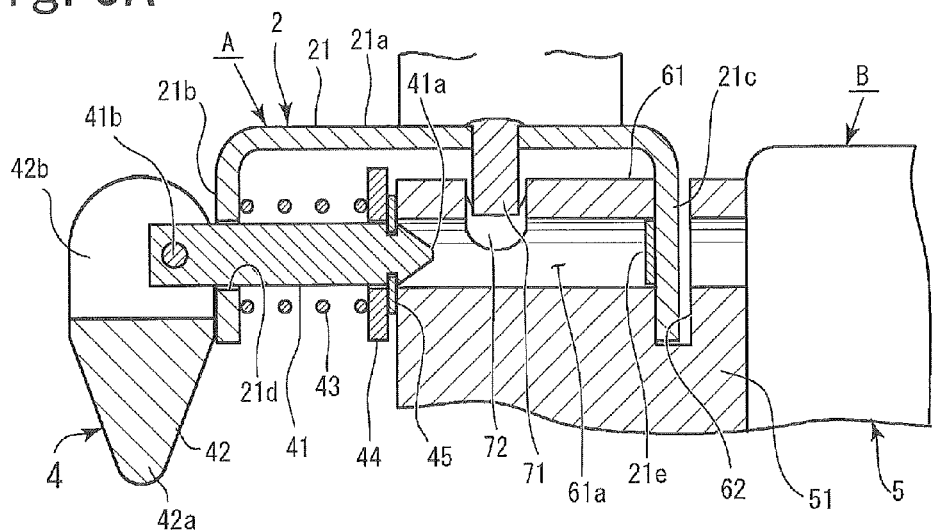
FIG. 3A is an enlarged sectional view of a part (Q2) in FIG. 2A.
Figure 3B:
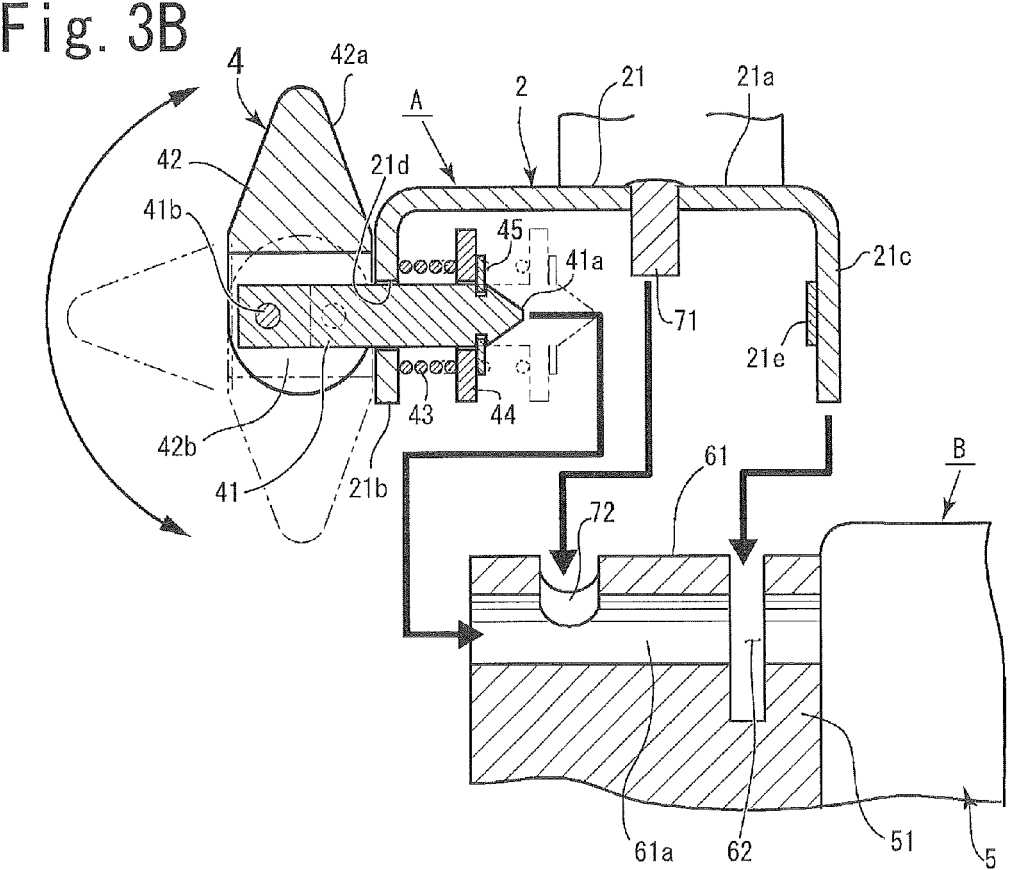
FIG. 3B is an enlarged sectional view showing a state where a supporting arm part and a lens main body of the part (Q2) in FIG. 2A are separated from each other.

The lens holding part 2 is configured so that the connected part 6 of the lens main body B is detachably connected to the lens holding part 2 (see FIGS. 3A and 3B). A concrete structure of the lens holding part 2 is that a holding frame 21 is formed, and the holding frame 21 is configured by a main frame piece 21a, a first side piece 21b, and a second side piece 21c (see FIGS. 1B, 2A, 2B, 3A, and 3B).

The main frame piece 21a is a plate piece in approximately a rectangular shape, and is formed in an inclined shape outward and upward from an end part of the inclined arm piece 12 of the supporting arm part A (see FIGS. 2B, 5A to 5D, etc.). At both ends in a longitudinal direction of the main frame piece 21a, the first side piece 21b and the second side piece 21c are bent to form right angles (including approximately right angles) with the main frame piece 21a (see FIGS. 2A, 2B, 3A, and 3B). An axis through-hole 21d is formed in the first side piece 21b of the holding frame 21, and a circular seat plate 21e is formed at an inner surface side of the second side piece 21c.

A holding unit 4 is provided in the lens holding part 2. The holding unit 4 is configured mainly by a holding axis 41, a knob 42, and an elastic member 43 (see FIGS. 2A, 2B, 3A, and 3B). The holding axis 41 is formed with a conical pressing front end part 41a at one end in an axial direction, and a pivot supporting pin 41b is inserted into the other end in the axial direction. The knob 42 is coupled to a holding axis 41 via the pivot supporting pin 41b.

Figure 1B:
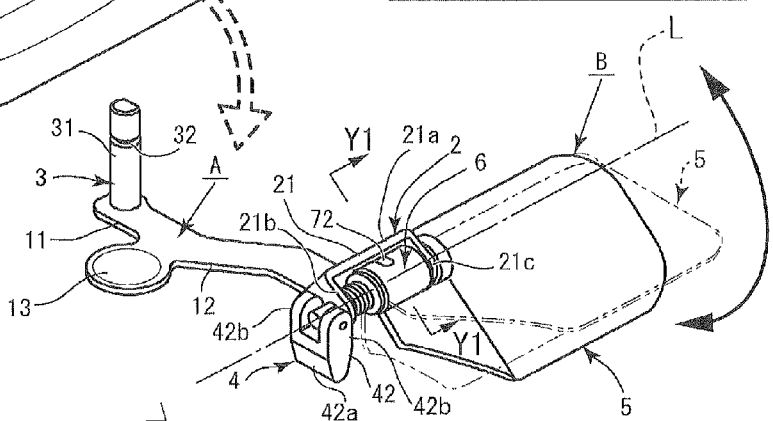
FIG. 1B is an enlarged view of a part (Q1) in FIG. 1A.
Figure 1C:
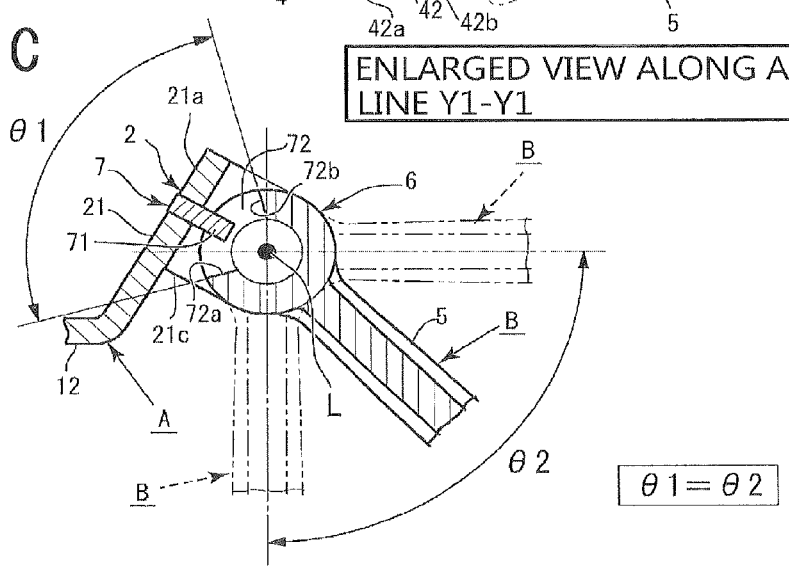
FIG. 1C is an enlarged sectional view taken along an arrowed line Y1-Y1 in FIG. 1B.

The knob 42 consists of a lever part 42a and two sandwiching pieces 42b (see FIGS. 1B, 2B, etc.). The lever part 42a is formed in approximately a triangular shape. Each sandwiching piece 42b is formed in approximately a semicircular shape or approximately a U shape, and both sides in a width direction are formed as flat surfaces (see FIGS. 2A, 2B, 3A, and 3B).

The sandwiching pieces 42b are forked portions that are opposite to each other in a parallel state (see FIGS. 2A and 2B). The other end in an axial direction of the holding axis 41 is arranged between the sandwiching pieces 42b, and the knob 42 and the holding axis 41 are pivotally coupled by the pivot supporting pin 41b (see FIGS. 2A, 2B, 3A, and 3B). The knob 42 can turn relative to the holding axis 41 about the pivot supporting pin 41b (see FIGS. 2A, 3A and, 3B).

When a state in which the lever part 42a and the sandwiching pieces 42b are arranged in a vertical direction (see FIGS. 2A, 3A, and 3B) is defined as a vertical direction of the knob 42, mounting positions of the pivot supporting pin 41b in the sandwiching pieces 42b are coupled eccentrically to either side of a vertical direction line of the sandwiching pieces 42b (see FIGS. 3A and 3B). Outer peripheral side surfaces of the sandwiching pieces 42b are formed in arc shapes, and contact the outer surface sides of the first side piece 21b of the holding frame 21 (see FIGS. 2A, 3A, and 3B).

For the elastic member 43, a coil spring is actually used (see FIGS. 2B, 3A, and 3B). The holding axis 41 pierces through the elastic member 43 that is the coil spring (see FIGS. 3A and 3B). The pressing front end part 41a of the holding axis 41 is loosely inserted into the axis through-hole 21d of the first side piece 21b so as to enter an inner side (an inner part side surrounded by the main frame piece 21a, the first side piece 21b, and the second side piece 21c) of the holding frame 21 (see FIGS. 2B, 3A, and 3B).

The knob 42 is turned approximately 180 degrees about the pivot supporting pin 41b, so that the holding axis 41 moves in an axial direction to enter and exit the axis through-hole 21d (see FIGS. 3A and 3B). A washer 44 is mounted at a pressing front end part 41a side of the holding axis 41, and the washer 44 is fixed by a guard ring 45. The elastic member 43 is arranged between the first side piece 21b of the holding frame 21 and the washer 44 (see FIGS. 2A, 2B, 3A, and 3B).

The washer 44 and the pressing front end part 41a of the holding axis 41 are always elastically biased toward a second side piece 21c by the elastic member 43. The knob 42 is reciprocally turned by 180 degrees about the pivot supporting pin 41b, so that the holding axis 41 reciprocally moves in the axis through-hole 21d (see FIGS. 3A and 3B).

The mounting part 3 has a fitted groove part 32 formed near an upper end of a pillar axis part 31 (see FIGS. 1B, 2A, 2B, and 7A to 7C). The mounting part 3 is mounted in a fitted state on a mounted part C which is formed on a face plate 81 of the sewing machine main body 8 (see FIGS. 7A to 7C). The mounted part C is configured by holding pieces 82 and a fitting elastic plate piece 83. Specifically, two holding pieces 82 are formed at an inner surface side of the face plate 81, and the fitting elastic plate piece 83 is mounted between the holding pieces 82 (see FIGS. 7A to 7C).

A fitting bent part 83a is formed in the fitting elastic plate piece 83, and the supporting arm part A can be mounted on the face plate 81 by fitting with the fitted groove part 32 of the pillar axis part 31 (see FIG. 7C). Accordingly, the supporting arm part A can turn on the horizontal surface centered around the pillar axis part 31 (see FIGS. 9A and 9C). An operation piece 13 is formed at an intermediate portion of the supporting arm part A. The operation piece 13 is formed in approximately a circular shape, which is easily nipped by operator fingers (see FIGS. 1B, 2A, and 2B).

The lens main body B is integrally formed by a synthetic resin such as plastics and an acrylic resin, and is configured by the lens part 5 and the connected part 6 (see FIGS. 2A, 2B, and 4A to 4C). The lens part 5 is formed in a rectangular shape having arc-shaped corners. The connected part 6 is detachably mounted on the lens holding part 2 of the supporting arm part A via the holding unit 4.

The connected part 6 continues to protrude outward from one end side in a longitudinal direction of the lens part 5, and is formed by a cylinder part 61 and an insertion groove part 62 (see FIGS. 2A, 2B, 3A, and 3B). The cylinder part 61 has an axis core hole 61a formed at a diameter center position. The insertion groove part 62 is formed orthogonally to an axial direction of the cylinder part 61 (see FIG. 2D). The insertion groove part 62 has a groove width that allows the second side piece 21c configuring the lens holding part 2 of the supporting arm part A to be inserted into the insertion groove part 62 (see FIGS. 3A and 3B).

The pressing front end part 41a of the holding axis 41 of the holding unit 4 can be inserted into an opening at the outer side of the axis core hole 61a. The circular seat plate 21e that is formed on the second side piece 21c of the holding frame 21 is inserted into the axis core hole 61a of the insertion groove part 62 (see FIGS. 1B, 3A, and 3B).

Next, a process of mounting the lens main body B on the lens holding part 2 of the supporting arm part A will be described with reference to FIGS. 3A and 3B. First, the knob 42 of the lens holding part 2 of the supporting arm part A is turned, and the holding axis 41 is pulled outside holding frame 21 by a maximum extent (see FIG. 3B).

In this state, the connected part 6 of the lens main body B is arranged between the pressing front end part 41a of the holding axis 41 in the holding frame 21 and the second side piece 21c. At this time, the axial direction of the cylinder part 61 coincides with a line shape that connects the pressing front end part 41a of the holding axis 41 and the second side piece 21c. The second side piece 21c is inserted into the insertion groove part 62 of the cylinder part 61, and the circular seat plate 21e is inserted into the axis core hole 61a (see FIG. 3A).

When the knob 42 is turned by 180 degrees, the holding axis 41 moves at an inner side of the holding frame 21 and also toward a second side piece 21c side, by the elastic force of the elastic member 43. Accordingly, the pressing front end part 41a of the holding axis 41 is inserted into the opening of the axis core hole 61a of the cylinder part 61. A portion between the opening of the axis core hole 61a at an outer end side of the cylinder part 61 and the insertion groove part 62 is held between the pressing front end part 41a of the holding axis 41 and the second side piece 21c on the basis of elastic pressure (see FIG. 3A).

In this way, the lens main body B becomes turnable about a horizontal axis L of the supporting arm part A, by the lens holding part 2 of the supporting arm part A and the holding unit 4 (see FIGS. 1B, 1C, 2A, 5A to 5D, etc.). Further, by elastic bias force of the elastic member 43, a portion between an outer end in an axial direction of the cylinder part 61 and the insertion groove part 62 is held on the basis of elastic pressure.

Therefore, the lens part 5 of the lens main body B can be stopped at an arbitrary position, and can maintain a stopped state. That is, the operator can use the lens part 5 at a desired inclination angle.

When the lens main body B is separated from the supporting arm part A, the knob 42 is turned by 180 degrees in a state in which the lens main body B is mounted. Then, the holding axis 41 that depresses the outer end opening of the cylinder part 61 of the lens main body B is pulled to the outside of the holding frame 21. In this way, the cylinder part 61 of the lens main body B is released from the state of being held by the holding unit 4, and can be separated from the supporting arm part A.

Next, a turning control unit 7 will be described. The turning control unit 7 plays a role of controlling the turning of the lens main body B relative to the supporting arm part A. The operator turns the lens main body B about the horizontal axis L within a turning range of the lens main body B controlled by the turning control unit 7, and sets the lens main body B at an inclination angle at which the operator can most easily confirm the operation state (see FIGS. 1A, and 5A to 5D).

Specifically, by setting the turning range of the lens part 5 of the lens main body B, set by the turning control unit 7, in a range in which the orientation of the lens part 5 can be changed between pendent and horizontal states, the lens main body B is stopped at a position most proper for the operator. In this way, the operation of passing a thread n through a needle hole 84a of a sewing machine needle 84 is facilitated, or a sewing state is confirmed. By controlling the turning range of the lens main body B, the turning control unit 7 also plays a role of preventing the lens part 5 from being too close to a position of the sewing machine needle 84 by exceeding the hanging state, and interfering with the position of the sewing machine needle 84.

There are a plurality of embodiments of the turning control unit 7. As a first embodiment, the turning control unit 7 is configured by a control pin 71 and a control groove 72 (see FIGS. 1C, 2B, 3A, 3B, 5A to 5D, etc.). The control pin 71 is formed to protrude to an inner side of the main frame piece 21a of the holding frame 21 of the supporting arm part A (see FIGS. 10, 2B, 3A, 3B, and 5A to 5D).

The control groove 72 is formed at an intermediate position of the cylinder part 61 of the lens main body B. The control groove 72 is formed at an angle θ1 in a predetermined range along a circumferential direction of the cylinder part 61 (see FIGS. 1C and 4C). The lens main body B can be turned by an angle θ2 relative to the angle θ1 of the control groove 72 (see FIGS. 1C and 5A to 5D).

Specifically, both terminals in the circumferential direction of the control groove 72 are taken as a first terminal part 72a and a second terminal part 72b. An angle formed by the first terminal part 72a and the second terminal part 72b is θ1. When the angle θ1 is 90 degrees, a turning range θ2 of the lens main body B is 90 degrees to the horizontal axis L (see FIGS. 1C and 5A to 5D).

A state in which the control pin 71 that is inserted into the control groove 72 contacts the first terminal part 72a is set so that the lens main body B becomes in a hanging shape (see FIG. 5B). A state in which the control pin 71 contacts the second terminal part 72b of the control groove 72 is set so that the lens part 5 becomes in a horizontal shape (see FIG. 5D).

By setting the lens main body B in this way, the lens main body B can turn and change the orientation between the pendent and the horizontal states (see FIGS. 5A, 5B, and 5D). Further, when the lens part 5 becomes in an inclined shape, the control pin 71 does not contact the first terminal part 72a or the second terminal part 72b of the control groove 72, and the control pin 71 can be positioned between the first terminal part 72a and the second terminal part 72b (see FIG. 5C).

Next, as a second embodiment of the turning control unit 7, a first protrusion 73a and a second protrusion 73b are provided on an outer periphery of the cylinder part 61 (see FIGS. 6A to 6D). The first protrusion 73a and the second protrusion 73b are portions that are formed to protrude outward from the outer peripheral surface of the cylinder part 61. When the cylinder part 61 turns, the cylinder part 61 contacts the main frame piece 21a of the holding frame 21. In the contact state, the cylinder part 61 cannot turn in the same direction any more. The first protrusion 73a and the second protrusion 73b play a role of a stopper in this way.

The first protrusion 73a and the second protrusion 73b are set so that when the lens part 5 of the lens main body B becomes in a hanging state, the first protrusion 73a contacts the main frame piece 21a of the holding frame 21 of the supporting arm part A (see FIG. 6B), and when the lens part 5 becomes in a horizontal state, the second protrusion 73b contacts the main frame piece 21a (see FIG. 6B). In this way, by only providing the first protrusion 73a and the second protrusion 73b in the cylinder part 61 of the lens main body B, the control pin 71 is not necessary in the supporting arm part A, and the turning control unit 7 can be set in a simple configuration.

Next, a detailed using method of the present invention will be described. The supporting arm part A is mounted on the face plate 81 of the sewing machine main body 8 via the mounting part 3. The operator selects the lens main body B of magnification that fits the eyesight of the operator among a plurality of lens main bodies, and mounts the lens main body B on the supporting arm part A.

The inclination angle of the lens part 5 is set to be aligned with an operator eye height position (see FIGS. 6A to 6D) In particular, a height position of the sewing machine needle 84 changes depending on a situation. By appropriately changing the inclination angle of the lens part 5 according to the height of the sewing machine needle 84 (see FIGS. 8A and 8B), it becomes possible to identify a position of the needle hole 84a of the sewing machine needle 84 by magnifying the view of the position (see FIG. 8C).

Figure 9A:
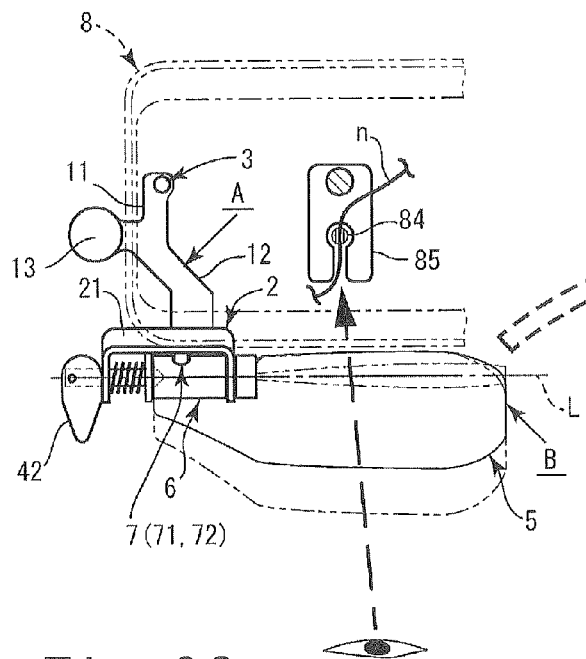
FIG. 9A is a partially-omitted plan view of a state of confirming a state in which the thread has passed through the sewing machine needle by positioning the magnifier in front of the sewing machine.
Figure 9B:
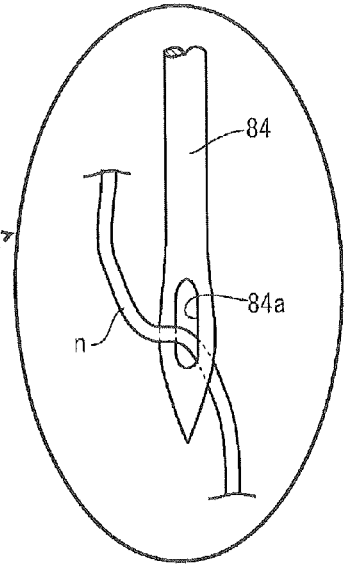
FIG. 9B is a front end view of the sewing machine needle that is viewed from the lens main body in FIG. 9A.
Figure 9C:
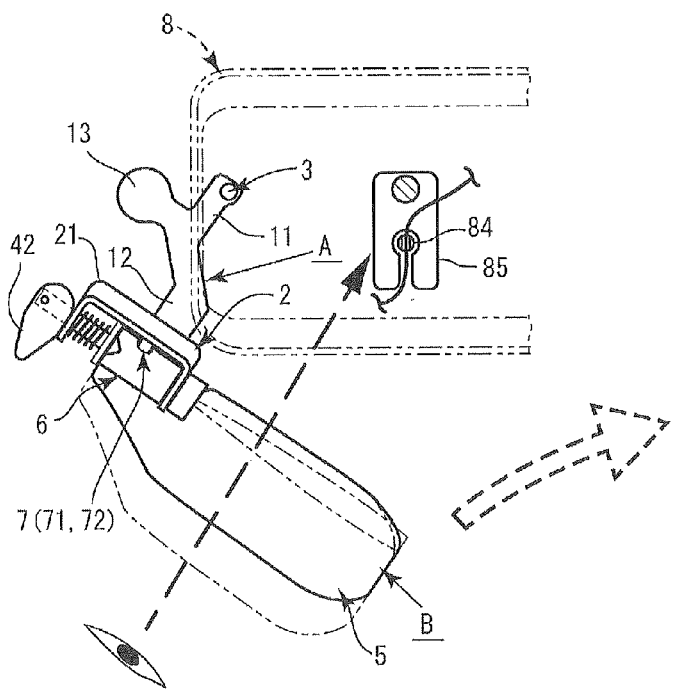
FIG. 9C is a partially-omitted plan view of a state of confirming a state in which the thread is passed through the sewing machine needle by positioning the magnifier in an inclined direction to the front of the sewing machine.
Figure 9D:
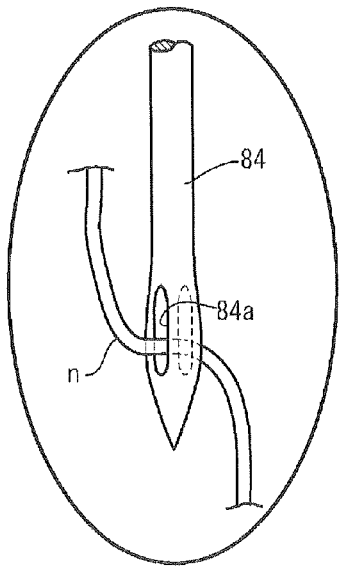
FIG. 9D is a front end view of the sewing machine needle that is viewed from the lens main body in FIG. 9C.

In the present invention, in many cases, the lens main body B is positioned at a front side of the sewing machine main body 8 (see FIGS. 9A and 9B). However, by setting the lens main body B at a slightly inclined position relative to a front surface of the sewing machine main body 8 as required, and magnifying and viewing the needle hole 84a of the sewing machine needle 84, it is also possible to confirm whether the thread n is correctly passed through the needle hole 84a (see FIGS. 9C and 9D). By using the present invention in this way, the invention is effective not only for the operation of passing the thread n through the needle hole 84a, but also for the exchange operation of the sewing machine needle 84 or a cloth presser 85, and the like.

In the second implementation mode, the turning control unit is configured so that a control member is formed at the lens holding part side and that a control groove part into which the control member is loosely inserted is formed in the connected part of the lens main body. With this arrangement, a turning angle can be regulated in an extremely simple configuration. Particularly, by using a pin material in an axis shape as the control member, a turning control unit in a simple structure can be provided.

In the third implementation mode, the turning control unit is configured by only forming a protrusion part in the lens holding part in the outer peripheral part of the connected part of the lens main body. With this arrangement, no processing is necessary at the lens holding part side. A turning control unit can be configured extremely simply.

In the fourth implementation mode, a turning range of the lens main body by the turning control unit is set as a range in which the lens part becomes in a vertical state from a horizontal state. With this arrangement, the lens main body can be prevented from interfering with other portions of the sewing machine main body. Specifically, because the turning of the lens main body stops at a position in a vertical shape, the lens main body can be prevented from contacting the needle which is mounted on the needle bar.

Further, because the turning stops when the lens main body is in a horizontal shape, it is possible to prevent blocking of an operation button and the like that are provided in the sewing machine main body. Further, the lens part is set to a range in which the lens part becomes in a horizontal shape to a vertical shape. Therefore, within this range, the lens part is at a position where it is easiest to view a portion of the needle hole of a needle front end that becomes a target, and it is easy to set a proper turning angle.

In the fifth implementation mode, the groove part which is formed on the outer peripheral surface of the mounting part and the fitting elastic plate piece which is provided on the face plate of the sewing machine main body are fitted and connected. The supporting arm part is set turnable on the horizontal surface. Therefore, the magnifier of the present invention can be mounted on the sewing machine main body extremely easily and promptly, and work efficiency of a whole sewing operation improves.

What is claimed is:

1. A magnifier for a sewing machine that is mounted on a sewing machine main body and magnifies a view of a front end of a needle which is mounted on a needle bar front end that moves vertically and a vicinity of a cloth presser,
   wherein the magnifier comprises:
   a supporting arm part, at one end of which a lens holding part having a holding unit that detachably holds a lens part is provided, and at the other end of which a mounting part for mounting the magnifier on the sewing machine main body is provided; and
   a lens main body that is constituted by a connected part which is detachable to the lens holding part, and the lens part which is formed continuously to the connected part,
   wherein a turning control unit is provided which controls a turning angle of the lens main body within a predetermined range to the lens holding part of the supporting arm part as well as the lens main body, and
   wherein the turning control unit controls a turning angle of the lens main body that is mounted on the lens holding part, within the predetermined range.

2. The magnifier for a sewing machine according to claim 1, wherein the turning control unit has a control member formed on a side of the lens holding part, and
   wherein the connected part of the lens main body has a control groove part in which the control member is loosely inserted.

3. The magnifier for a sewing machine according to claim 1, wherein the turning control unit has a protrusion part which is formed on an outer peripheral part of the connected part of the lens main body, and which controls turning of the lens main body by contacting the lens holding part.

4. The magnifier for a sewing machine according to claim 1, wherein the range of turning of the lens main body by the turning control unit is a range within which the state of the lens part transforms to a vertical state from a horizontal state.

5. The magnifier for a sewing machine according to claim 1, wherein a fitted groove part which is formed on an outer peripheral surface of the mounting part and a fitting elastic plate piece which is provided on a face plate of the sewing machine main body are rotatably fitted and connected together, and
   wherein the supporting arm part is turnable on a horizontal surface.

* * * * *